US012652346B2

(12) United States Patent
Chance et al.

(10) Patent No.: US 12,652,346 B2
(45) Date of Patent: Jun. 9, 2026

(54) SYSTEMS AND METHODS FOR A CONTACT FLOW VISUALIZER

(71) Applicant: STATE FARM MUTUAL AUTOMOBILE INSURANCE COMPANY, Bloomington, IL (US)

(72) Inventors: Jonathan Chance, Chandler, AZ (US); Daniel Enomoto, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 134 days.

(21) Appl. No.: 18/666,272

(22) Filed: May 16, 2024

(65) Prior Publication Data

US 2025/0358361 A1     Nov. 20, 2025

(51) Int. Cl.
        *H04M 3/22*          (2006.01)
        *H04M 3/51*          (2006.01)
(52) U.S. Cl.
        CPC ........... *H04M 3/2218* (2013.01); *H04M 3/51* (2013.01)
(58) Field of Classification Search
        CPC .............................. H04M 3/2218; H04M 3/51
        USPC ................... 379/266.1, 265.02, 242, 265.01
        See application file for complete search history.

(56) References Cited

U.S. PATENT DOCUMENTS

| | | | |
|---|---|---|---|
| 6,879,685 B1 | 4/2005 | Peterson et al. | |
| 7,039,166 B1 | 5/2006 | Peterson et al. | |
| 9,628,623 B2 | 4/2017 | Vymenets et al. | |
| 9,674,352 B1 * | 6/2017 | Roberts ................. | G06N 5/025 |
| 2013/0055137 A1 * | 2/2013 | Choc ..................... | G06Q 30/02 |
| | | | 715/772 |
| 2018/0114126 A1 * | 4/2018 | Das ....................... | G06F 3/0481 |

* cited by examiner

*Primary Examiner* — Thjuan K Addy
(74) *Attorney, Agent, or Firm* — Bookoff McAndrews, PLLC

(57)              ABSTRACT

The method comprises receiving a contact identifier and a time identifier, retrieving one or more contact logs corresponding to the contact identifier and the time identifier, segmenting the one or more contact logs into a plurality of contact log segments based on a contact flow identifier for each of the one or more contact logs, for each contact log segment, retrieving a plurality of contact flows based on the contact flow identifier of the contact log segment, partitioning the plurality of contact log segments based on a block identifier for each of the plurality of blocks, analyzing the one or more partitioned contact log segments based on the plurality of contact flows to determine a contact path, creating a visual representation of the contact path, and outputting the visual representation to a user interface of a user device.

20 Claims, 12 Drawing Sheets

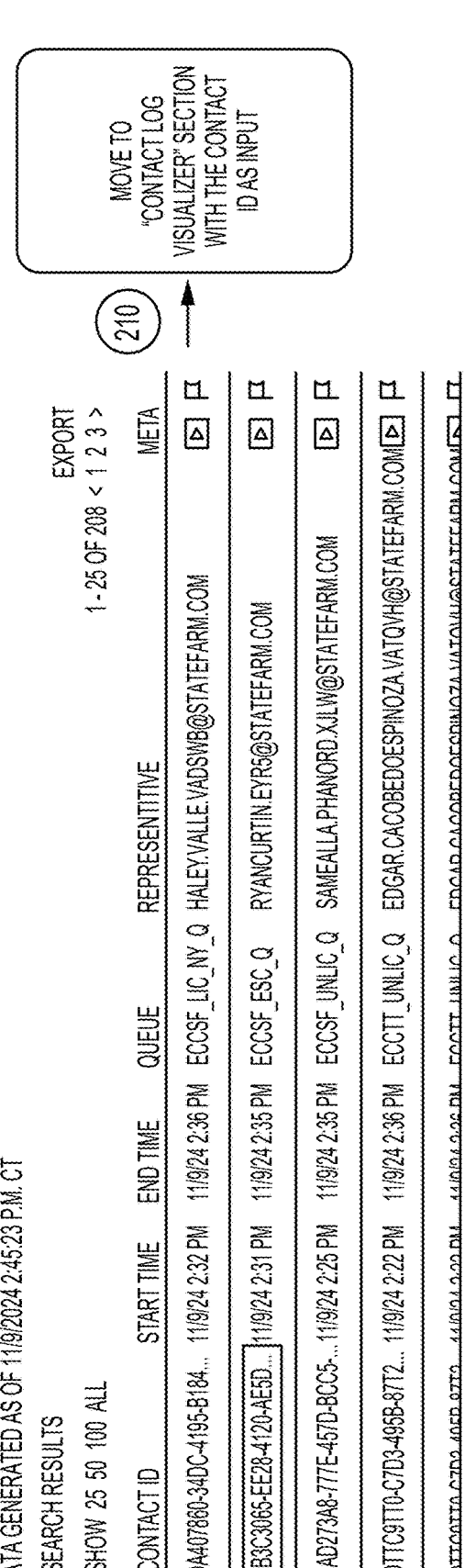

MOVE TO "CONTACT LOG VISUALIZER" SECTION WITH THE CONTACT ID AS INPUT

210

SEARCH SUMMARY

| TOTAL RECORDS | AVG. QUEUE TIME | AVG. TOTAL CALL TIME | AVG. ACW |
|---|---|---|---|
| 206 | 00:00:37 | 00:05:04 | 00:00:38 |

DATA GENERATED AS OF 11/9/2024 2:45:23 P.M. CT

SEARCH RESULTS

SHOW 25 50 100 ALL

EXPORT

1 - 25 OF 208 < 1 2 3 >

| CONTACT ID | START TIME | END TIME | QUEUE | REPRESENTITIVE | META |
|---|---|---|---|---|---|
| DA407860-34DC-4195-B184... | 11/9/24 2:32 PM | 11/9/24 2:36 PM | ECCSF_LIC_NY_Q | HALEY.VALLE.VADSWB@STATEFARM.COM | |
| 9B3C3065-EE28-4120-AE5D... | 11/9/24 2:31 PM | 11/9/24 2:35 PM | ECCSF_ESC_Q | RYAN.CURTIN.EYR5@STATEFARM.COM | |
| FAD273A8-777E-457D-BCC5... | 11/9/24 2:25 PM | 11/9/24 2:35 PM | ECCSF_UNLIC_Q | SAMEALLA.PHANORD.XJLW@STATEFARM.COM | |
| OTTC9TTO-C7D3-495B-8T2... | 11/9/24 2:22 PM | 11/9/24 2:36 PM | ECCTT_UNLIC_Q | EDGAR.CACOBEDOESPINOZA.VATQVH@STATEFARM.COM | |

FIG. 2 CONT.

CONTINUED
FROM FIG. 3

CONTINUED
FROM FIG. 3

| FIELD | VALUE |
|---|---|
| CONTACTFLOWID | ARN: AWS: CONNECT :US-WEST-2 :493773397414 : INSTANCE/714F40DB-D79B-4EE6-A582-... |
| CONTACTFLOWMODULETYPE | GETUSERINPUT |
| CONTACTFLOWNAME | CCC_ADD_VEHICLE |
| CONTACTID | E1018811-1201-49EE-A49F-7D01BC07E5B6 |
| IDENTIFIER | ADD CAR SUBMENU - LOA 2 |
| | |
| PARAMETERS.PARAMETER.0 | CONTACTID=E1018811-1201-49EE-A49F-7D01BC07E5B6 |
| PARAMETERS.PARAMETER.1 | ACTIONFLAG=CONFIRMREPLACE |
| PARAMETERS.PARAMETER.2 | CONTACTFLOWNAME=CCC_ADD_VEHICLE |
| PARAMETERS.PARAMETER.3 | VALIDINTENTS=1;2;3;4 |
| PARAMETERS.PARAMETER.4 | ERRORMSG= I AM SORRY, I DO NOT RECOGNIZE ONE OF THOSE OPTIONS. TELL ME HOW... |
| PARAMETERS.TEXT | TELL ME HOW I CAN HELP YOU? TO REPLACE A VEHICLE, PRESS ONE. TO ADD A... |
| PARAMETERS.TEXTTOSPEECHTYPE | TEXT |
| PARAMETERS.VOICE | JOANNA |
| TIMESTAMP | 2023-11-07T12:05:56.998Z |

*FIG. 4*

```
FLOWNAME : PAYMENT_FLOW
BLOCKS : [
     BLOCK 1 : {
          POSITION : {
               X : 50.0
               Y : 25.0
          }
          IDENTIFIER : PLAY HOLDING PROMPT
          TYPE : MESSAGEPARTICIPANT

PARAMETERS : {
               PARAM1 : VALUE1,
               PARAM2 : VALUE1,

...
               PARAM N : VALUE N,
          }

TRANSITIONS : {
               SUCCESS : BLOCK1
               CONDITION 1 : BLOCK2,

...
               CONDITION M : BLOCK M,
          }
     }
]
```

FIG. 5

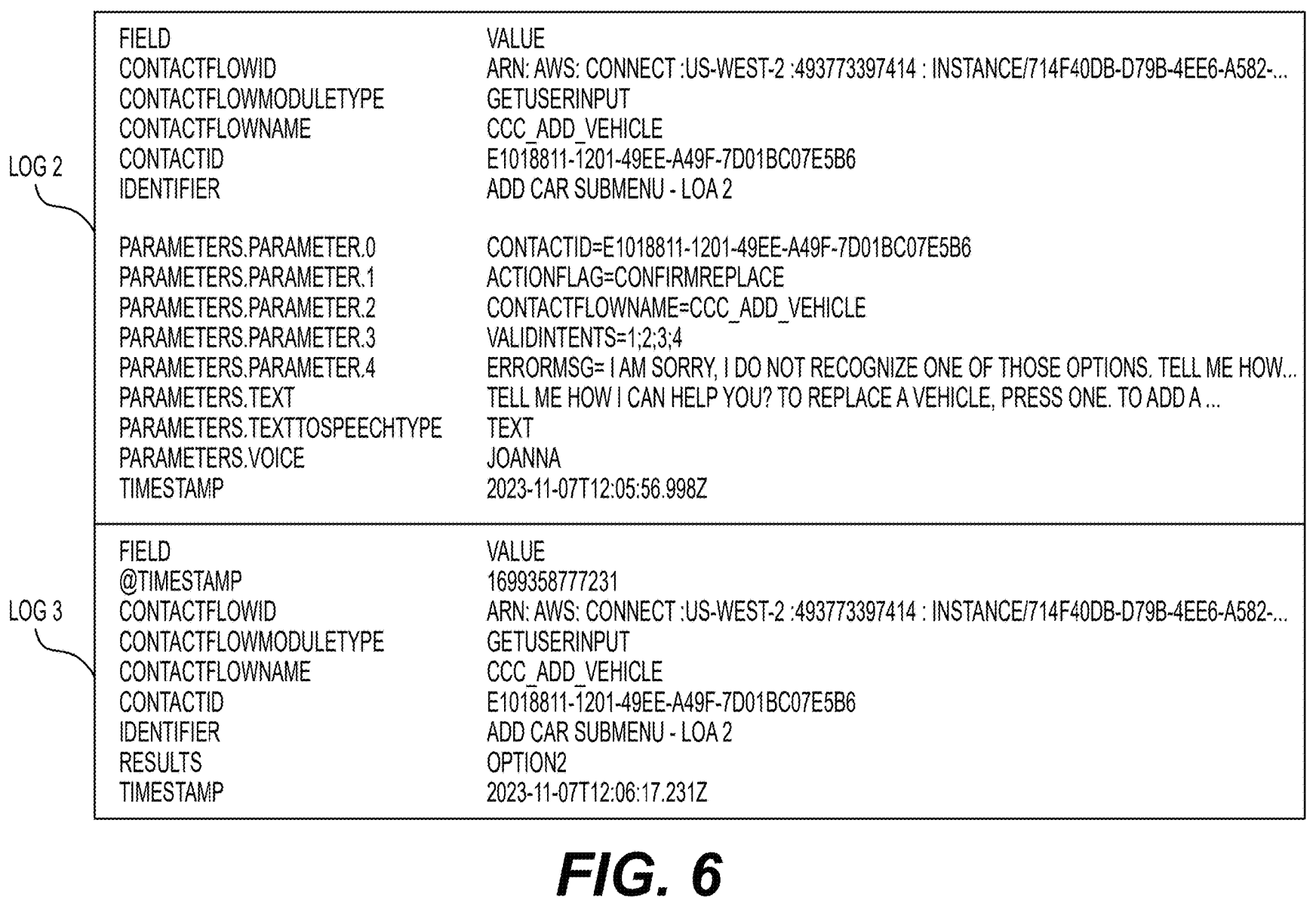

LOG 2

| FIELD | VALUE |
|---|---|
| CONTACTFLOWID | ARN: AWS: CONNECT :US-WEST-2 :493773397414 : INSTANCE/714F40DB-D79B-4EE6-A582-... |
| CONTACTFLOWMODULETYPE | GETUSERINPUT |
| CONTACTFLOWNAME | CCC_ADD_VEHICLE |
| CONTACTID | E101881I-1201-49EE-A49F-7D01BC07E5B6 |
| IDENTIFIER | ADD CAR SUBMENU - LOA 2 |
| | |
| PARAMETERS.PARAMETER.0 | CONTACTID=E101881I-1201-49EE-A49F-7D01BC07E5B6 |
| PARAMETERS.PARAMETER.1 | ACTIONFLAG=CONFIRMREPLACE |
| PARAMETERS.PARAMETER.2 | CONTACTFLOWNAME=CCC_ADD_VEHICLE |
| PARAMETERS.PARAMETER.3 | VALIDINTENTS=1;2;3;4 |
| PARAMETERS.PARAMETER.4 | ERRORMSG= I AM SORRY, I DO NOT RECOGNIZE ONE OF THOSE OPTIONS.  TELL ME HOW... |
| PARAMETERS.TEXT | TELL ME HOW I CAN HELP YOU? TO REPLACE A VEHICLE, PRESS ONE. TO ADD A... |
| PARAMETERS.TEXTTOSPEECHTYPE | TEXT |
| PARAMETERS.VOICE | JOANNA |
| TIMESTAMP | 2023-11-07T12:05:56.998Z |

LOG 3

| FIELD | VALUE |
|---|---|
| @TIMESTAMP | 1699358777231 |
| CONTACTFLOWID | ARN: AWS: CONNECT :US-WEST-2 :493773397414 : INSTANCE/714F40DB-D79B-4EE6-A582-... |
| CONTACTFLOWMODULETYPE | GETUSERINPUT |
| CONTACTFLOWNAME | CCC_ADD_VEHICLE |
| CONTACTID | E101881I-1201-49EE-A49F-7D01BC07E5B6 |
| IDENTIFIER | ADD CAR SUBMENU - LOA 2 |
| RESULTS | OPTION2 |
| TIMESTAMP | 2023-11-07T12:06:17.231Z |

*FIG. 6*

```
STARTFLOW : FLOW 1
FLOWS : {
    FLOW 1 : {
        FLOWNAME : PAYMENT_FLOW
        STARTBLOCK : BLOCK T
        BLOCKS : {
            BLOCK 1 : {
                POSITION : {
                    X : 50.0
                    Y : 25.0
                }
                IDENTIFIER : PLAY HOLDING PROMPT
                TYPE : MESSAGEPARTICIPANT
                PARAMETERS : {
                    PARAM1 : FILLEDVALUE1,
                    PARAM2 : FILLEDVALUE2,

PARAMN : FILLEDVALUEN,
                }
                TRANSITIONS : {
                    SUCCESS : BLOCK 1,
                    CONDITION 1 : BLOCK 2,

CONDITION M : BLOCK M
                }
                SELECTED TRANSITION : CONDITION 1,
                NEXTBLOCK : BLOCK 2,
                PREVIOUSBLOCK : NONE
                LOGS : {
                    LOG1,
                    LOG2,
                    ...
                }
            }
        }
    } ...
}
```

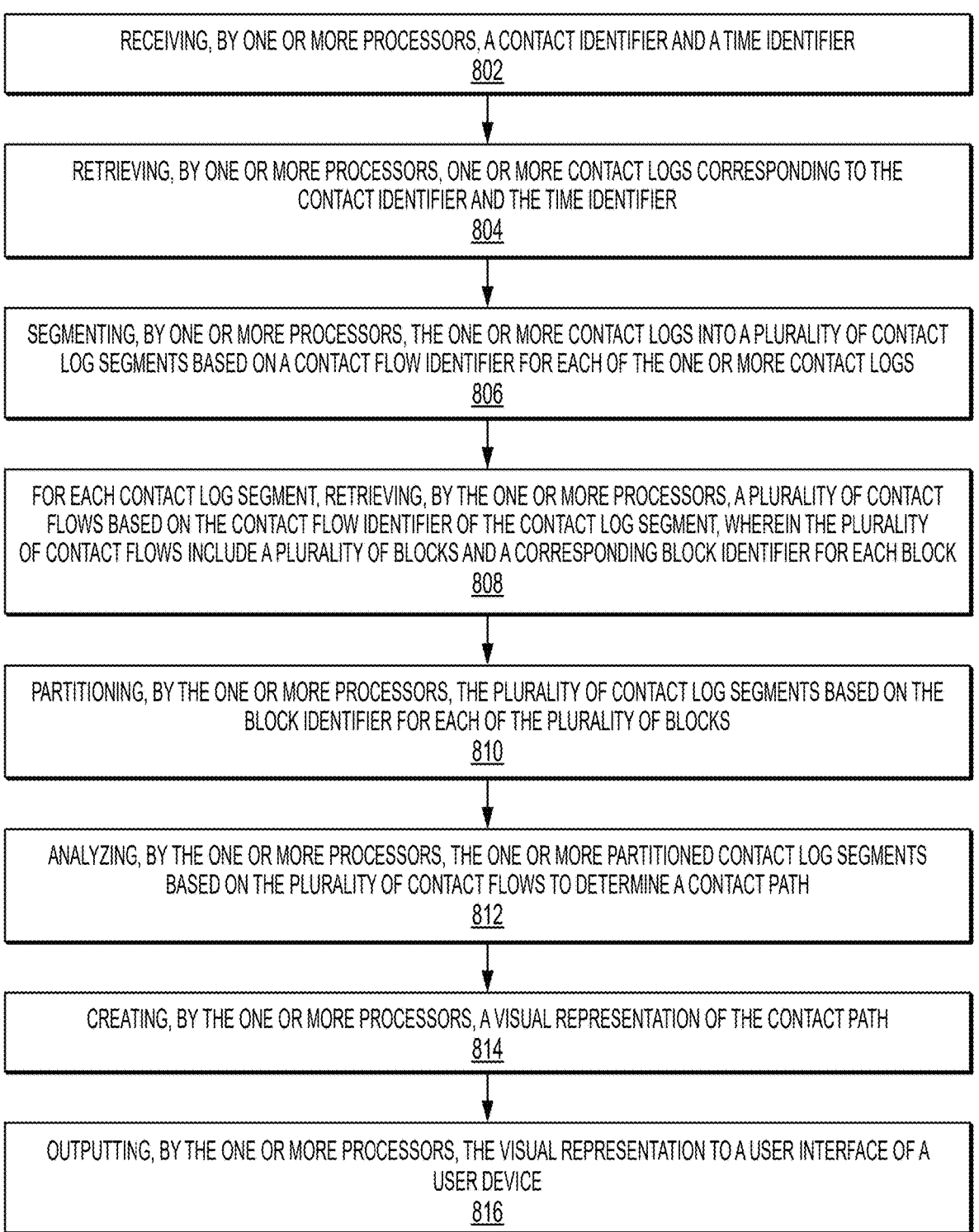

RECEIVING, BY ONE OR MORE PROCESSORS, A CONTACT IDENTIFIER AND A TIME IDENTIFIER
802

RETRIEVING, BY ONE OR MORE PROCESSORS, ONE OR MORE CONTACT LOGS CORRESPONDING TO THE CONTACT IDENTIFIER AND THE TIME IDENTIFIER
804

SEGMENTING, BY ONE OR MORE PROCESSORS, THE ONE OR MORE CONTACT LOGS INTO A PLURALITY OF CONTACT LOG SEGMENTS BASED ON A CONTACT FLOW IDENTIFIER FOR EACH OF THE ONE OR MORE CONTACT LOGS
806

FOR EACH CONTACT LOG SEGMENT, RETRIEVING, BY THE ONE OR MORE PROCESSORS, A PLURALITY OF CONTACT FLOWS BASED ON THE CONTACT FLOW IDENTIFIER OF THE CONTACT LOG SEGMENT, WHEREIN THE PLURALITY OF CONTACT FLOWS INCLUDE A PLURALITY OF BLOCKS AND A CORRESPONDING BLOCK IDENTIFIER FOR EACH BLOCK
808

PARTITIONING, BY THE ONE OR MORE PROCESSORS, THE PLURALITY OF CONTACT LOG SEGMENTS BASED ON THE BLOCK IDENTIFIER FOR EACH OF THE PLURALITY OF BLOCKS
810

ANALYZING, BY THE ONE OR MORE PROCESSORS, THE ONE OR MORE PARTITIONED CONTACT LOG SEGMENTS BASED ON THE PLURALITY OF CONTACT FLOWS TO DETERMINE A CONTACT PATH
812

CREATING, BY THE ONE OR MORE PROCESSORS, A VISUAL REPRESENTATION OF THE CONTACT PATH
814

OUTPUTTING, BY THE ONE OR MORE PROCESSORS, THE VISUAL REPRESENTATION TO A USER INTERFACE OF A USER DEVICE
816

*FIG. 8*

SYSTEMS AND METHODS FOR A CONTACT FLOW VISUALIZER

TECHNICAL FIELD

Various embodiments of this disclosure relate generally to systems and methods for utilizing a contact flow visualizer to create a visualization of communications with a contact center system.

BACKGROUND

In contact call centers, it is common for external users (e.g., customers) to call the contact call center to speak to a representative for customer service. Throughout the life-cycle of the call, an external user may have to navigate through multiple menu options before eventually reaching a human contact to speak with. During this process in which the external user is navigating through the menu, the actions taken by the external user may generate contact flow logs that may represent what the external user is experiencing and encountering. The generated contact flow logs may then be used for: (1) analyzing external user behavior; and/or (2) troubleshooting if there are common pitfalls in an external user experience when interacting with a contact call center.

The contact flow logs may include a directed graph representing a set of potential paths a customer may take when calling a contact center. The contact flow logs may be made up of components called blocks that may represent actions that occurred during the communication between the external user and the contact center. Each block may correspond to a specific action that may have been taken during a call with the external user. The block may range from being simple as a menu in which an external user may select an option by pressing a number on a keypad, to more complex, such as where an external user's data may be retrieved from a database. For example, the actions corresponding to the blocks may include queueing a call and/or a chat, playing a prompt, interacting with a bot, collecting data about an external user, and/or assigning reporting elements. Additionally, many actions may occur while the external user is communicating with the system, including traversing multiple contact flows. For example, a single contact between the external user and the contact center may generate up to 200+ contact flow logs, where each log entry in the contact flow logs may be very verbose. As a result, this volume of data may slow down the process of analyzing the contact flow logs, as well as make it difficult to pinpoint if and where errors may be occurring.

Conventional methods may include manually analyzing the contact flow logs. However, the contact flow logs may be difficult to evaluate because they are time consuming to view, as well as difficult to examine quickly. Evaluating the contact flow logs may be time consuming because there may be 200+ logs to sort through in sequence. Evaluating the contact flow logs may be difficult to perform quickly because each log entry may have a different structure with different information. As a result, a need exists to quickly and efficiently analyze the contact flow logs to troubleshoot potential errors in the contact center system.

This disclosure is directed to addressing the above-referenced challenges and/or other problems in the art. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, embodiments are disclosed for a contact flow visualizer.

In one aspect, an exemplary embodiment of a method for a contact flow visualizer is disclosed. The method may include receiving, by one or more processors, a contact identifier and a time identifier. The method may further include retrieving, by the one or more processors, one or more contact logs corresponding to the contact identifier and the time identifier. The method may further include parti-tioning, by the one or more processors, the one or more contact logs into a plurality of contact log segments based on a contact flow identifier for each of the one or more contact logs. The method may further include, for each contact log segment, retrieving, by the one or more processors, a plu-rality of contact flows based on the contact flow identifier of the contact log segment, wherein the plurality of contact flows include a plurality of blocks and a corresponding block identifier for each block. The method may further include partitioning, by the one or more processors, the plurality of contact log segments based on the block iden-tifier for each of the plurality of blocks. The method may further include analyzing, by the one or more processors, the plurality of partitioned contact log segments based on the plurality of contact flows to determine a contact path. The method may further include creating, by the one or more processors, a visual representation of the contact path. The method may further include outputting, by the one or more processors, the visual representation to a user interface of a user device.

In one aspect, a computer system for a contact flow visualizer is disclosed. The computer system may comprise a memory having processor-readable instructions stored therein and one or more processors configured to access the memory and execute the processor-readable instructions, which when executed by the one or more processors con-figures the one or more processors to perform a plurality of functions. The functions may include receiving a contact identifier and a time identifier. The functions may further include retrieving one or more contact logs corresponding to the contact identifier and the time identifier. The functions may further include partitioning the one or more contact logs into a plurality of contact log segments based on a contact flow identifier for each of the one or more contact logs. The functions may further include, for each contact log segment, retrieving a plurality of contact flows based on the contact flow identifier of the contact log segment, wherein the plurality of contact flows include a plurality of blocks and a corresponding block identifier for each block. The functions may further include partitioning the plurality of contact log segments based on the block identifier for each of the plurality of blocks. The functions may further include ana-lyzing the plurality of partitioned contact log segments based on the plurality of contact flows to determine a contact path. The functions may further include creating a visual representation of the contact path. The functions may further include outputting the visual representation to a user inter-face of a user device.

In one aspect, a non-transitory computer-readable medium containing instructions for a contact flow visualizer is disclosed. The instructions may comprise receiving, by one or more processors, a contact identifier and a time identifier. The instructions may further comprise retrieving, by the one or more processors, one or more contact logs corresponding to the contact identifier and the time identifier. The instructions may further comprise partitioning, by the one or more processors, the one or more contact logs into a plurality of contact log segments based on a contact flow identifier for each of the one or more contact logs. The instructions may further comprise, for each contact log segment, retrieving, by the one or more processors, a plurality of contact flows based on the contact flow identifier of the contact log segment, wherein the plurality of contact flows include a plurality of blocks and a corresponding block identifier for each block. The instructions may further comprise partitioning, by the one or more processors, the plurality of contact log segments based on the block identifier for each of the plurality of blocks. The instructions may further comprise analyzing, by the one or more processors, the plurality of partitioned contact log segments based on the plurality of contact flows to determine a contact path. The instructions may further comprise creating, by the one or more processors, a visual representation of the contact path. The instructions may further comprise outputting, by the one or more processors, the visual representation to a user interface of a user device.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4 depicts exemplary contact log data, according to one or more embodiments.

FIG. 5 depicts exemplary Flow Blueprint data, according to one or more embodiments.

FIG. 6 depicts exemplary partitioned log data, according to one or more embodiments.

FIG. 7 depicts an exemplary rendered Flow Blueprint, according to one or more embodiments.

FIG. 8 depicts a method for a contact flow visualizer, according to one or more embodiments.

DETAILED DESCRIPTION OF EMBODIMENTS

Figure 1:
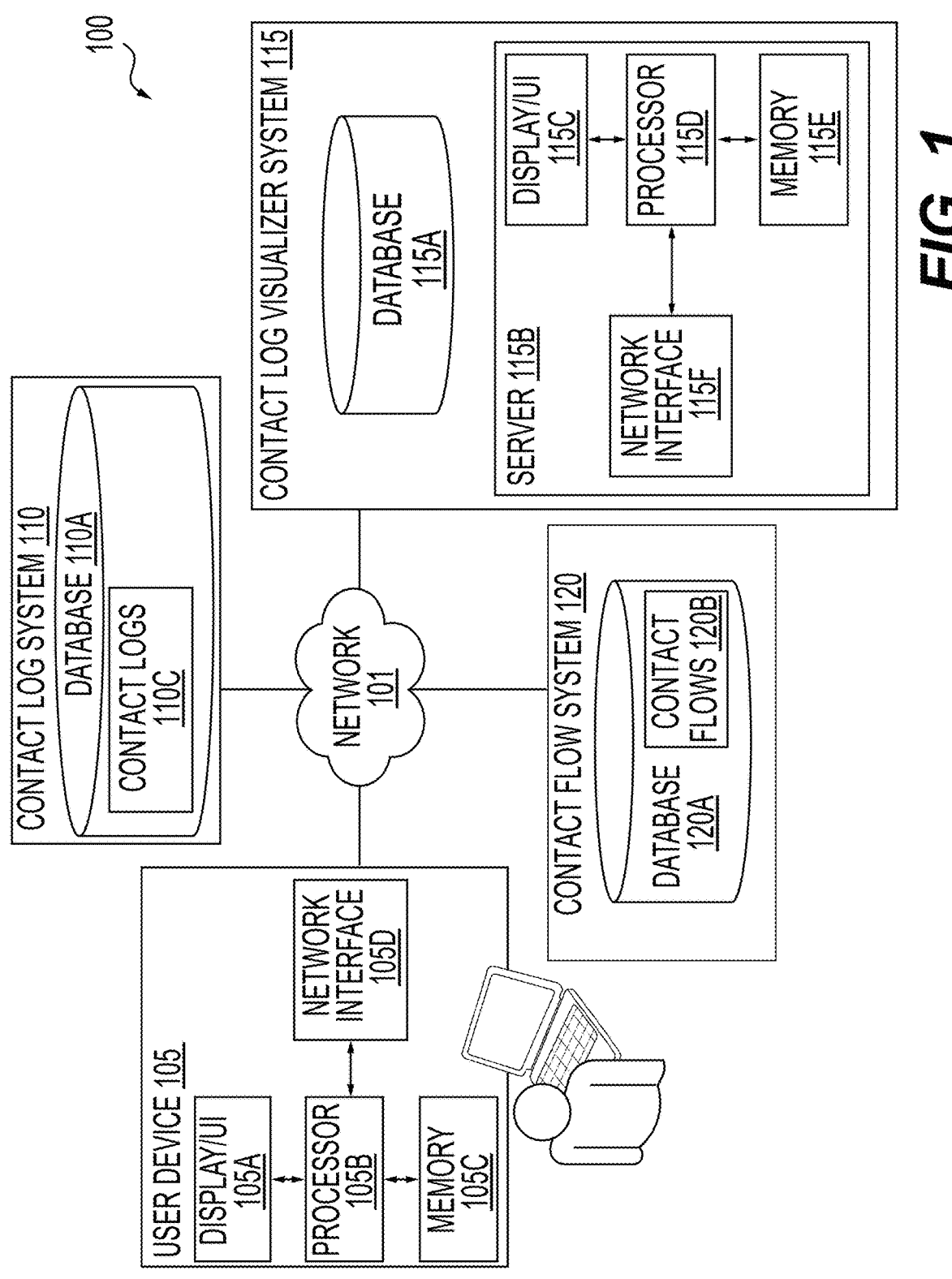
FIG. 1 depicts an exemplary networked computing environment that may be utilized with techniques presented herein, according to one or more embodiments.

According to certain aspects of the disclosure, methods and systems for a contact flow visualizer are disclosed.

Whenever an external user (e.g., customer) communicates with a contact center (e.g., call center), contact flow logs may be generated. The contact flow logs may represent actions that occurred during the communication between the external user and the contact center. For example, the actions may include queueing a call and/or a chat, playing a prompt, interacting with a bot, collecting data about an external user, and/or assigning reporting elements. Additionally, many actions may occur while the external user is communicating with the system, including traversing multiple contact flows. For example, a single contact between the external user and the contact center may generate up to 200+ contact flow logs, where each log entry in the contact flow logs may be very verbose. As a result, this may slow down the process of analyzing the contact flow logs, as well as make it difficult to pinpoint if and where errors may be occurring.

Conventional methods may include manually analyzing the contact flow logs. However, the contact flow logs may be difficult to evaluate because they are time consuming to view, as well as difficult to examine quickly. Evaluating the contact flow logs may be time consuming because there may be 200+ logs to sort through in sequence. Evaluating the contact flow logs may be difficult to perform quickly because each log entry may have a different structure with different information. As a result, a need exists to quickly and efficiently analyze the contact flow logs to troubleshoot potential errors in the contact center system.

The claimed systems and methods analyze the contact flow logs to determine relevant information, as well as create a visually decipherable format of the pertinent information for users (e.g., technical developers and business resources) to reference when troubleshooting the system and/or gain a better understanding of a path that an external user took. For example, the systems and methods may utilize contact flows, which correspond to the contact flow logs, to determine the relevant information for the contact flow visualizer. The contact flow visualizer may then use the relevant information to create a visual representation of a specific path taken by the external user, where the user may take multiple paths, and then present the visual representation in an easy to understand format.

The systems and methods may increase the efficiency of users who are troubleshooting a potential issue in the contact center. For example, by filtering the contact flow log data and presenting a visual representation, the user is able to more effectively perform error trapping and root cause analysis. Additionally, the systems and methods may enable a non-technical audience to assist in troubleshooting, as well as have a better understanding of customer behavior.

As will be discussed in more detail below, in various embodiments, systems and methods are described for a contact flow visualizer. The systems and methods may include receiving, by one or more processors, a contact identifier and a time identifier. The systems and methods may further include retrieving, by the one or more processors, one or more contact logs corresponding to the contact identifier and the time identifier. The systems and methods may further include partitioning, by the one or more processors, the one or more contact logs into a plurality of contact log segments based on a contact flow identifier for each of the one or more contact logs. The systems and methods may further include, for each contact log segment, retrieving, by the one or more processors, a plurality of contact flows based on the contact flow identifier of the contact log segment, wherein the plurality of contact flows include a plurality of blocks and a corresponding block identifier for each block. The systems and methods may further include partitioning, by the one or more processors, the plurality of contact log segments based on the block identifier for each of the plurality of blocks. The systems and methods may further include analyzing, by the one or more processors, the plurality of partitioned contact log segments based on the plurality of contact flows to determine a contact path. The systems and methods may further include creating, by the one or more processors, a visual representation of the contact path. The systems and methods may further include outputting, by the one or more processors, the visual representation to a user interface of a user device.

Exemplary Environment

FIG. 1 depicts an exemplary environment 100 that may be utilized with the techniques presented herein. One or more user device(s) 105, one or more external system(s) (e.g., contact log system 110, contact flow system 120), and one or more server system(s) (e.g., contact log visualizer system 115) may communicate across a network 101. As will be discussed in further detail below, the contact log visualizer system 115 may communicate with one or more of the other components of the environment 100 across network 101. The user device 105 may be associated with a user, such as a developer.

In some embodiments, the components of the environment 100 are associated with a common entity. In some embodiments, one or more of the components of the environment is associated with a different entity than another. The systems and devices of the environment 100 may communicate in any arrangement.

The user device 105 may be configured to enable the user to access and/or interact with other systems in the environment 100. For example, the user device 105 may be a computer system such as, for example, a desktop computer, a mobile device, a tablet, etc. In some embodiments, the user device 105 may include one or more electronic application(s), e.g., a program, plugin, browser extension, etc., installed on a memory of the user device 105.

The user device 105 may include a display/user interface (UI) 105A, a processor 105B, a memory 105C, and/or a network interface 105D. The user device 105 may execute, by the processor 105B, an operating system (O/S) and at least one electronic application (each stored in memory 105C). The electronic application may be a desktop program, a browser program, a web client, or a mobile application program (which may also be a browser program in a mobile O/S), an applicant specific program, system control software, system monitoring software, software development tools, or the like. For example, environment 100 may extend information on a web client that may be accessed through a web browser. In some embodiments, the electronic application(s) may be associated with one or more of the other components in the environment 100. The application may manage the memory 105C, such as a database, to transmit streaming data to network 101. The display/UI 105A may be a touch screen or a display with other input systems (e.g., mouse, keyboard, etc.) so that the user(s) may interact with the application and/or the O/S. The network interface 105D may be a TCP/IP network interface for, e.g., Ethernet or wireless communications with the network 101. The processor 105B, while executing the application, may generate data and/or receive user inputs from the display/UI 105A and/or receive/transmit messages to the server system 115, and may further perform one or more operations prior to providing an output to the network 101.

The contact log system 110 may correspond to one or more systems that may interact with one or more external users (e.g., customers). For example, the contact log system 110 may create one or more contact logs based on the external user's communications with a contact center system (not pictured). The contact log system 110 may include a database 110A. The database 110A may be hosted on a third party server and/or in a memory of the contact log system 110. For example, database 110A may store one or more contact logs 110C, which may have been generated based on the external user's communications with the contact center. The contact log system 110 may be in communication with other device(s) or system(s) in the environment 100 over the one or more networks 101. For example, the contact log system 110 may communicate with the contact log visualizer system 115 via API (application programming interface) access over the one or more networks 101, and may also communicate with the user device 105 via web browser access over the one or more networks 101.

In various embodiments, the network 101 may be a wide area network ("WAN"), a local area network ("LAN"), a personal area network ("PAN"), or the like. In some embodiments, network 101 includes the Internet, and information and data provided between various systems occurs online. "Online" may mean connecting to or accessing source data or information from a location remote from other devices or networks coupled to the Internet. Alternatively, "online" may refer to connecting or accessing a network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

The contact log visualizer system 115 may include an electronic data system, e.g., a computer-readable memory such as a hard drive, flash drive, disk, etc. In some embodiments, the contact log visualizer system 115 includes and/or interacts with an application programming interface for exchanging data to other systems, e.g., one or more of the other components of the environment. In some embodiments, the contact log visualizer system 115 may correspond to a computing subsystem that may perform one or more of the operations described in relation to FIGS. 2-9.

The contact log visualizer system 115 may include a database 115A and at least one server 115B. The contact log visualizer system 115 may be a computer, system of computers (e.g., rack server(s)), and/or or a cloud service computer system. The contact log visualizer system 115 may store or have access to database 115A (e.g., hosted on a third party server or in memory 115E). For example, database 115A may store previous contact log visualizations. The server(s) 115B may include a display/UI 115C, a processor 115D, a memory 115E, and/or a network interface 115F. The display/UI 115C may be a touch screen or a display with other input systems (e.g., mouse, keyboard, etc.) for an operator of the server 115B to control the functions of the server 115B. The contact log visualizer system 115 may execute, by the processor 115D, an operating system (O/S) and at least one instance of a servlet program (each stored in memory 115E).

The contact flow system 120 may include a database 120A. The contact flow system 120 may be a computer, system of computers (e.g., rack server(s)), and/or or a cloud service computer system. The contact flow system 120 may store or have access to database 120A (e.g., hosted on a third party server or in a memory). For example, database 120A may store one or more contact flows 120B. The contact flow system 120 may be in communication with other device(s) or system(s) in the environment 100 over the one or more networks 101. For example, the contact flow system 120 may communicate with the contact log visualizer system 115 via API (application programming interface) access over the one or more networks 101, and also communicate with the user device(s) 105 via web browser access over the one or more networks 101.

In the methods below, various acts may be described as performed or executed by a component from FIG. 1, such as the contact flow system 120, the contact log visualizer system 115, the contact log system 110, the user device 105, or components thereof. However, it should be understood that in various embodiments, various components of the environment 100 discussed above may execute instructions or perform acts including the acts discussed above and below. An act performed by a device may be considered to be performed by a processor, actuator, or the like associated with that device. Further, it should be understood that in various embodiments, various steps may be added, omitted, and/or rearranged in any suitable manner.

In general, any process or operation discussed in this disclosure that is understood to be computer-implementable, such as the processes illustrated in FIGS. 2-9, may be performed by one or more processors of a computer system, such any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Although depicted as separate components in FIG. 1, it should be understood that a component or portion of a component in the environment 100 may, in some embodiments, be integrated with or incorporated into one or more other components. For example, a portion of the display 115C may be integrated into the user device 105 or the like. In some embodiments, operations or aspects of one or more of the components discussed above may be distributed amongst one or more other components. Any suitable arrangement and/or integration of the various systems and devices of the environment 100 may be used.

Exemplary Flow Chart for Retrieving a Contact Identifier

Figure 2:
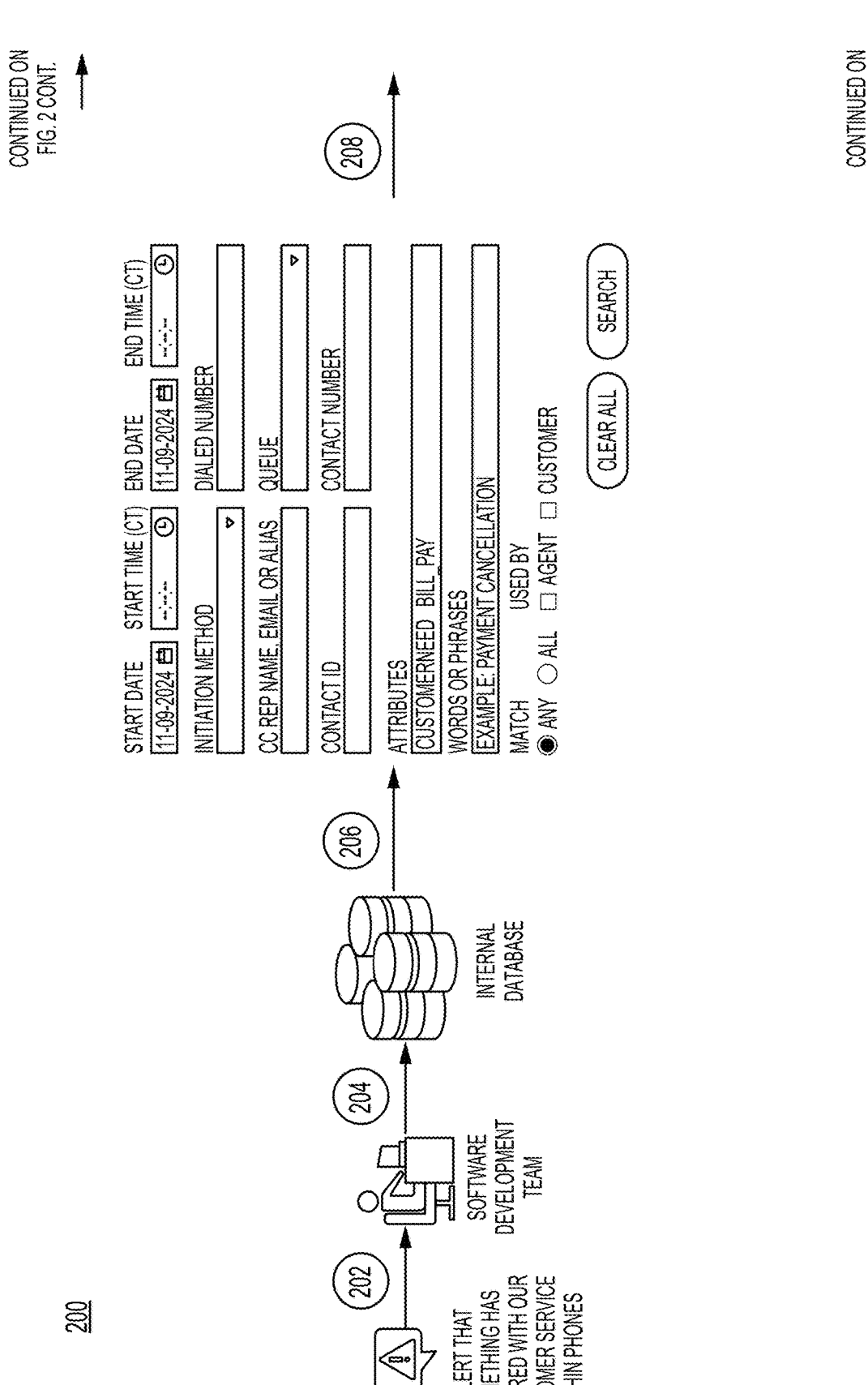
FIG. 2 depicts a flow chart for retrieving a contact identifier, according to one or more embodiments.

FIG. 2 depicts a flow chart 200 for retrieving a contact identifier, according to one or more embodiments. Notably, the process depicted in the flow chart 200 may be performed by one or more processors of a server that is in communication with the user device (e.g., user device 105), the contact log visualizer system (e.g., contact log visualizer system 115), and the contact flow system (e.g., contact flow system 120) via a network (e.g., network 101). However, it should be noted that the method may be performed by any one or more of the server, one or more user devices, contact log system, contact flow system, contact log visualizer system, and/or other systems.

At step 202, the flow chart may begin with sending an alert to a user (e.g., software development team) of a potential issue with the customer service phones. At step 204, to address the alert, the user (e.g., software development team), may access information within the internal databases to begin the troubleshooting process. At step 206, the user may filter data stored in the internal databases based on criteria related to the issue. For example, if the alert corresponds to an external user (e.g., a customer) having an issue paying the external user's bill, the criteria may include bill related communications. The user may search the internal databases for contact identifiers that correspond to bill related communications. The contact identifiers may include a unique identifier associated with a communication (e.g., a phone call) between the system (e.g., call center) and an external user (e.g., a customer). For example, each individual communication between the system and the external user may have a different contact identifier. At step 208, after applying the filters, a list of contact identifiers that are associated with the filters may be returned to the user. At least one of the contact identifiers in the list of contact identifiers may be analyzed to troubleshoot the issue associated with the alert. At step 210, contact logs may be filtered based on the contact identifier to identify the contact logs that correspond to a particular communication.

Although FIG. 2 shows example blocks of exemplary flow chart 200, in some implementations, the exemplary flow chart 200 may include additional blocks, fewer blocks, different blocks, or differently arranged blocks than those depicted in FIG. 2. Additionally, or alternatively, two or more of the blocks of the exemplary flow chart 200 may be performed in parallel.

Exemplary Flow Chart for Utilizing a Contact Flow Visualizer

Figure 3:
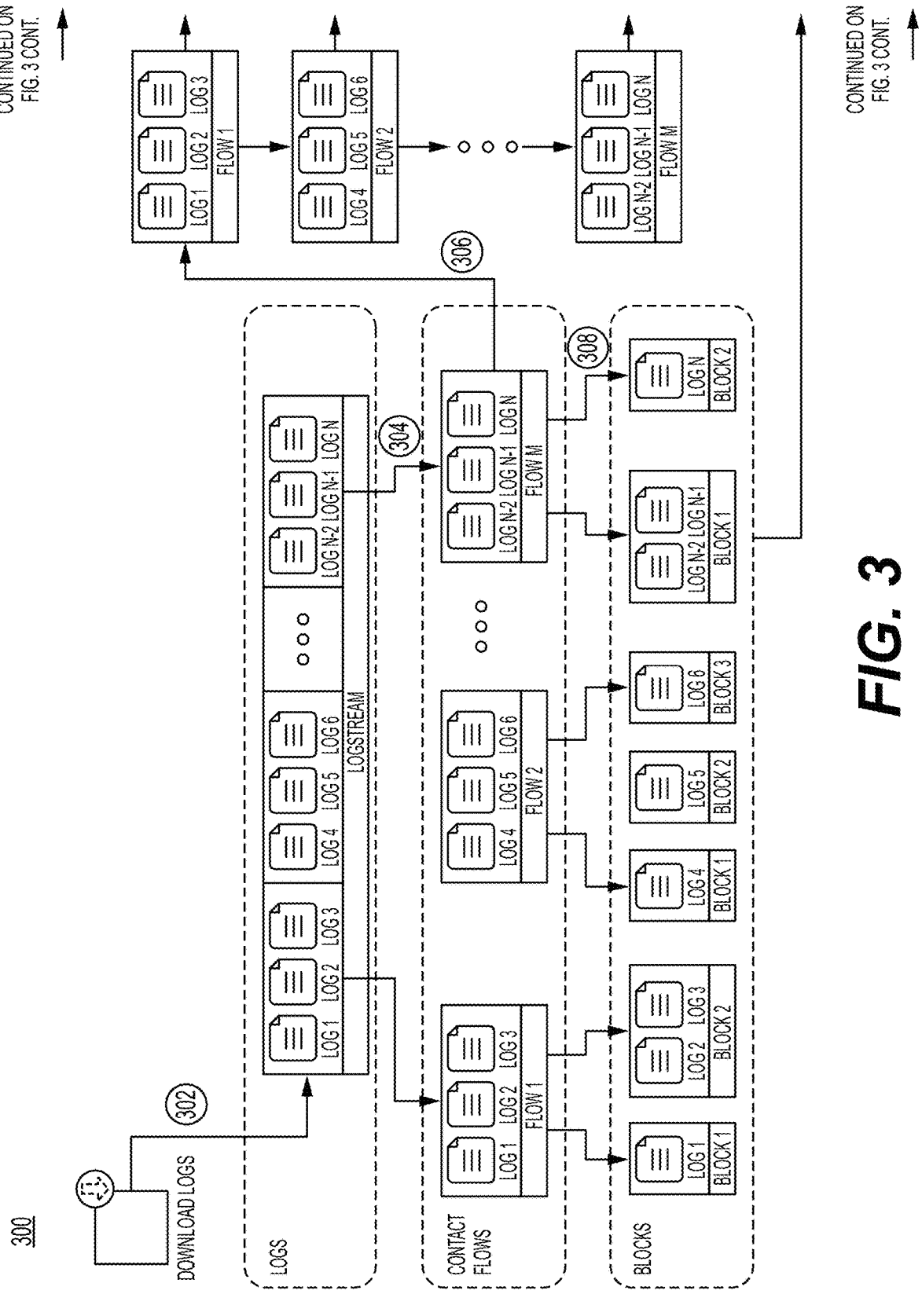
FIG. 3 depicts a flow chart for utilizing a contact flow visualizer, according to one or more embodiments.
Figure 3:
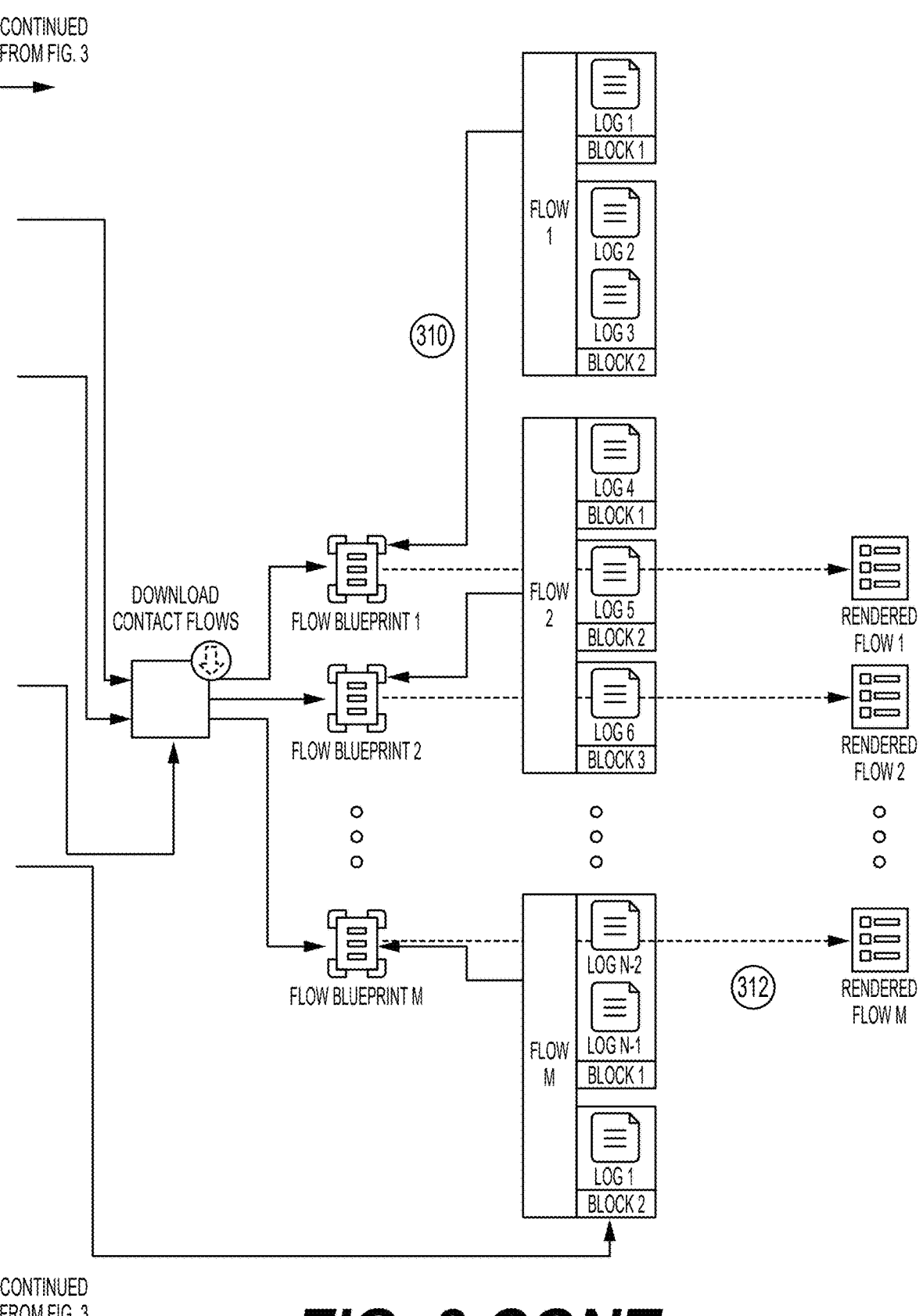

FIG. 3 depicts a flow chart 300 for utilizing a contact flow visualizer, according to one or more embodiments. Notably, the process depicted in the flow chart 300 may be performed by one or more processors of a server that is in communication with the user device (e.g., user device 105), the contact log visualizer system (e.g., contact log visualizer system 115), and the contact flow system (e.g., contact flow system 120) via a network (e.g., network 101). However, it should be noted that the method may be performed by any one or more of the server, one or more user devices, contact log system, contact flow system, contact log visualizer system, and/or other systems.

At step 302, a user may download contact logs. For example, the user may input the contact identifier (as described in the previous section) and a date-time range into a cloud system to download the corresponding contact logs. FIG. 4 depicts exemplary contact log data of Log N–2, according to one or more embodiments. For example, as shown in FIG. 4, the contact log may include a "Contact-FlowID" that may identify a corresponding contact flow JSON (JavaScript Object Notation), which is described in further detail below. Additionally, the contact log may also include a "ContactID" that may correspond to the contact identifier.

At step 304, once all of the corresponding contact logs have been downloaded, the system may partition the contact logs into segments based on a contact flow identifier. The contact logs may include the contact flow identifier, where the partitioning may include analyzing the contact logs to determine the contact flow identifier, and then partitioning the contact logs based on the contact flow identifier. The contact identifier may correspond to a unique identifier for an individual communication (e.g., a call), where the contact flow identifier may correspond to a unique identifier for a specific contact flow entered on the communication. For example, a single electronic communication may have one contact identifier and multiple contact flow identifiers. Additionally, for example, a contact flow may correspond to a general flow, where an external user may be presented with a default menu, and another contact flow later in a call lifecycle may represent the external user retrieving how much of a balance is left on the external user's gift card.

At step 306, for each unique contact flow identifier, a corresponding contact flow JSON may be downloaded by utilizing a cloud system API (Application Programming Interface). The contact flow JSON may indicate a Flow Blueprint that outlines what all potential paths/actions that an external user (e.g., a customer) may have taken during a communication with the system. The Flow Blueprint may define the steps ("blocks") of the external user's actions. The Flow Blueprint may include block data that corresponds to each of the blocks.

FIG. 5 depicts exemplary Flow Blueprint data, according to one or more embodiments. For example, as shown in FIG. 5, the Flow Blueprint data includes data for each block. The block data may include position data, an identifier, a type, one or more parameters, and/or one or more transitions. The position data may include x, y coordinates for the block. The identifier may describe the action of the block. The type may describe the block type. The one or more parameters may include information that retains details specific to the block's functionality. The one or more transitions include a condition that, if met, may determine the next path an external user may take during the lifecycle of a communication.

At step 308, once all of the contact flows have been downloaded, the contact logs may be segmented even further, by partitioning the contact logs based on the Flow Blueprint block corresponding to an "identifier" field in a corresponding contact log. For example, as shown in FIG. 4, the contact log may include an "identifier" field, which may be used to determine a Flow Blueprint block. The contact log may then be partitioned based on the Flow Blueprint block.

At step 310, as described below, the partitioned logs are used for each block to determine the transitions that the external user took during the external user's communication with the system. FIG. 6 depicts partitioned log data for Log 2 and Log 3, according to one or more embodiments. The Log 2 data may include a contact flow identifier, a contact identifier, a block identifier, and/or one or more parameters, where the Log 2 data may be similar to the Log n–2 data. The Log 3 data may include a contact flow identifier and a contact identifier, where the Log 3 data may be similar to the Log 2 and the Log N–2 data.

As mentioned above, the block data may include x, y coordinates of each block, block metadata, block parameters, block transitions, and the like. Each of the block parameters may include information that retains details specific to the block's functionality. For example, a parameter of a "Play Prompt" block may include the audio that an external user (e.g., a customer) hears when the block is played (e.g., "Please stay on the line as we connect you with a representative."). The parameter information may assist a user in troubleshooting any system issues, by providing background information that directed an external user in the external user's communication with the system. Each block may have its own set of parameters within the Flow Blueprint. The Flow Blueprint may also include a key for each block's set of parameters. The contact logs may also include the same key. The key may be used to correlate the set of parameter values for a block in the Blueprint Flow to the same values in the contact logs. For example, the key may be used to match a particular Flow Blueprint to a contact log. In some embodiments, the parameter values may be manually hardcoded by a user. Additionally, or alternatively, the parameter values may be dynamically created and assigned based on a path an external user took during the communications with the system.

The transitions may include a condition that, if met, may determine the next path an external user may take during the lifecycle of a communication. For example, a transition may include "pressing option 2" from a menu that may include four menu options. Each menu option may be a transition, where the transition may direct an external user based on the external user's selection. The Flow Blueprint may store the list of all possible transitions, where the contact logs may indicate the transition that actually occurred.

The contact logs may include a "results" field, where the "results" field may select the proper transition from the Flow Blueprint. If the "results" field is not present in the contact log, the transition may be "success." The "success" transition may be stored as a "selectedTransition" in the contact log. The remaining transitions may still be stored in the rendered flow. For example, the user interface may display all potential paths, as well as indicate the path that was selected by the external user.

The contact log and the flow blueprint may be analyzed to determine a block in the flow blueprint that matches a transition in the contact log. Upon determining the matching block, the block data in the flow blueprint may be analyzed to determine the x, y coordinates of the block. The x, y coordinates of the block may be sent to the visualizer, where the visualizer may use the x, y coordinates to draw the blocks in the user interface.

Since the contact logs may be partitioned by each block, using the contact logs in sequence may allow for analyzing the correct sequence of transitions of the external user's communication. For example, each block may store the "next block" and the "previous block" to indicate the correct sequence of transitions.

At step 312, the Flow Blueprints may be concatenated and rendered into a singular set that includes all of the contact flows. The beginning contact flow may be recorded as a "startFlow." FIG. 7 depicts an exemplary rendered Flow Blueprint, according to one or more embodiments. For example, as shown in FIG. 7, the rendered flow includes a block position, one or more parameters, one or more transitions, a next block indicator, and/or a previous block indicator. The next block indicator may include an identifier that corresponds to the next block in the communication flow.

Although FIG. 3 shows example blocks of exemplary flow chart 300, in some implementations, the exemplary flow chart 300 may include additional blocks, fewer blocks, different blocks, or differently arranged blocks than those depicted in FIG. 3. Additionally, or alternatively, two or more of the blocks of the exemplary flow chart 300 may be performed in parallel.

Exemplary Method for Utilizing a Contact Flow Visualizer

FIG. 8 depicts a method 800 for a contact flow visualizer, according to one or more embodiments. Notably, the method may be performed by one or more processors of a server (e.g., contact log visualizer system 115) that is in communication with one or more user devices (e.g., user device 105) and other internal or external system(s) (e.g., contact log system 110, contact flow system 120) via a network (e.g., network 101). However, it should be noted that the method may be performed by any one or more of the server, one or more user devices, or other internal or external systems.

The method may include receiving, by one or more processors, a contact identifier and a time identifier (Step 802). The contact identifier may correspond to a unique identifier that is associated with a particular interaction (e.g., a phone call) between a call center system and an external user (e.g., a customer). For example, the contact identifier may include a dialed number, a called number, and the like. As discussed previously, FIG. 2 depicts a flow chart 200 for retrieving a contact identifier, according to one or more embodiments. The time identifier may correspond to a specific time or a time range for when the interaction occurred. A user (e.g., a developer) may manually input the contact identifier and/or the time identifier via a user device (e.g., user device 105). In some embodiments, the contact identifier and/or the time identifier may be automatically input into the contact flow visualizer. Additionally, or alternatively, a contact identifier without the time identifier may be input into the contact flow visualizer.

The method may further include retrieving, by the one or more processors, one or more contact logs corresponding to the contact identifier and the time identifier (Step 804). The contact logs may include information regarding different events that took place during the external user's interaction with the call center system. In some embodiments, the contact logs may include one or more JSON files. Additionally, or alternatively, the contact flows may be stored in one or more JSON files.

A data store (e.g., database 110) in a contact log system (e.g., contact log system 110) may store the contact logs (e.g., contact logs 110C). In some embodiments, the contact log visualizer may send the contact identifier and the time identifier to the contact log system. Upon receiving the contact identifier and the time identifier, the contact log system may access the database to determine the contact logs that include the contact identifier and the time identifier, and then the contact log system may send such contact logs to the contact log visualizer.

Alternatively, in some embodiments, the contact log visualizer may retrieve the contact logs from the contact log system. Upon receiving the contact identifier and the time identifier, the contact flow visualizer may analyze one or more contact logs to determine which contact logs match the contact identifier and the time identifier. For example, the contact log may include the contact identifier and a time stamp of when the interaction between the external user and the call center system occurred. The contact flow visualizer may analyze the contact identifiers and the time stamps of one or more contact logs to determine the contact logs that include the contact identifier. The contact flow visualizer may also analyze the time stamps of the contact logs to determine which contact logs have a time stamp that falls within the range specified in the time identifier.

The method may further include partitioning, by the one or more processors, the one or more contact logs into a plurality of contact log segments based on a contact flow identifier for each of the one or more contact logs (Step 806). The contact logs may include one or more contact flow identifiers that may each reference a contact flow. The contact flow may include an outline of the specific actions a customer may have taken during the interaction with the call center system. For example, an external user may interact with the automated function of the call center system. The call center system may present the external user with one or more options (e.g., "press 1 to speak with a specialist"), where the contact flow log may stores data corresponding to the options that were presented to the user. Additionally, the contact flow log may also store data corresponding to the option that the external user selected (e.g., the user selects "1").

The contact flow visualizer may analyze the contact log to determine the contact flow identifiers stored in the log. The contact flow visualizer may then partition the contact log into segments that correspond to the contact flow identifiers.

The method may further include, for each contact log segment, retrieving, by the one or more processors, a plurality of contact flows based on the contact flow identifier of the contact log segment, wherein the plurality of contact flows include a plurality of blocks and a corresponding block identifier for each block (Step 808). A database (e.g., database 120A) of a contact flow system (e.g., contact flow system 120) may store the contact flows (e.g., contact flows 120B). The contact flow visualizer may send the contact flow identifiers to the contact flow system. Upon receiving the contact flow identifiers, the contact flow system may retrieve the contact flow logs that include the contact flow identifiers, and then send such contact flow logs to the contact log visualizer.

The contact flow logs may have a corresponding blueprint that outlines the actions that an external user may take during the interaction. The blueprint may be a representation (e.g., a JSON stored representation) of a contact flow, where the blueprint may represent all potential paths an external user may take when the external user communicates with the call center system. The contact flow logs may represent the specific path an external user took during the external user's communications with the call center system. The blueprint may include a plurality of blocks (e.g., steps) that signify the steps that the external user took during the interaction with the call center system. Each block may correspond to a different step in the interaction.

Each block may have block data that may include x, y coordinates of each block, metadata, parameters, transitions, and the like. The plurality of blocks may include one or more transitions and one or more parameters. The one or more transitions may correspond to a condition that may determine a next path step during the external user's interaction with the call center system. For example, one transition may include "pressing option 2" from a menu comprising four menu options, where each menu option would be a transition that directs an external user through the interaction based on the external user's selection. The contact flow log may include all of the possible transitions that an external user may be able to take through the course of the interaction.

The one or more parameters may include information corresponding to at least one of the plurality of blocks, such as information regarding the block's specific functionality. For example, a parameter of a "Play Prompt" may include the exact audio that a customer may hear when the audio is played, such as "Please stay on the line as we connect you with a representative." Such information may be useful to troubleshoot and understand what information may have been set in the background to direct a customer on the customer's call. Each parameter may include a "key" that may identify which parameters in the contact log and the contact flow log are the same. For example, the "keys" may be utilized to match up the blueprint to the contact logs.

The contact flow logs may include a "Results" field that may indicate the proper transition from the blueprint. Additionally, if the "Results" field is not present, then the transition may be a "Success," where such a transition may be stored as the "selectedTransition."

The method may further include partitioning, by the one or more processors, the plurality of contact log segments based on the block identifier for each of the plurality of blocks (Step 810). For example, each block may include a block identifier that uniquely identifies the block and the block's contents (e.g., parameters and transitions). The contact flow visualizer may analyze each of the contact log segments for a block identifier for each block, and then partition the contact log segments based on the block identifier.

The method may further include analyzing, by the one or more processors, the plurality of partitioned contact log segments based on the plurality of contact flows to determine a contact path (Step 812). The contact path may correspond to the sequential blocks that represent the external user's interaction with the call center system.

In some embodiments, the analyzing the plurality of partitioned contact log segments may comprise analyzing, by the one or more processors, the one or more transitions of the plurality of blocks to determine the next path step, and wherein the contact path includes a plurality of next path steps. The contact flow visualizer may analyze the contact flow log that corresponds to the partitioned contact log segment to determine the specific block that corresponds to the partitioned contact log. For example, the contact flow visualizer may analyze the blocks in the contact flow log to determine a block identifier that matches the partitioned contact log segment. Upon finding a matching block identifier, the contact flow visualizer may analyze the block's data to determine at least one transition that occurs subsequent to the block. The transition may indicate the next path step in the external user's interaction with the call center system. The contact path may include a plurality of next path steps that correspond to the external user's interaction with the call center system.

In some embodiments, analyzing the plurality of partitioned contact log segments may comprise analyzing, by the one or more processors, the one or more parameters of each of the plurality of blocks to determine the next path step. The parameters may indicate what occurred at a particular block, which may inform the contact flow visualizer of what may happen next in the flow. As described above, the contact flow visualizer may analyze the partitioned contact log segment to determine a corresponding block. After finding the corresponding block, the contact flow visualizer may analyze the block data of the corresponding block to determine the parameters for the specific block.

In some embodiments, the analyzing the plurality of partitioned contact log segments may further comprise analyzing, by the one or more processors, the plurality of partitioned contact log segments to determine a set of block coordinates. As described above, the contact flow visualizer may analyze the partitioned contact log segment to determine a corresponding block. After finding the corresponding block the contact flow visualizer may analyze the block data of the corresponding block to determine the coordinates (e.g., x, y coordinates) of the block in a contact flow display (e.g., a user interface display). The coordinates may indicate how the particular block would be displayed in relation to other blocks via a user interface. The partitioning the one or more contact logs may further comprise storing, by the one or more processors, the set of block coordinates for each partitioned contact log segment in a data store. For example, each set of block coordinates and the block identifier may be stored in a database for future reference by the contact flow visualizer, where the contact flow visualizer may access the database to retrieve the block coordinates.

The method may further include creating, by the one or more processors, a visual representation of the contact path (Step 814). The visual representation of the contact path may include visual representations of the blocks that comprise the external user's interaction with the call center system. The visual representation may also include one or more lines that connect the visual representations of the blocks. In some embodiments, creating the visual representation may be based on the set of block coordinates for each of the plurality of blocks. For example, for each block, the contact flow visualizer may use each block identifier to retrieve the block coordinates. The contact flow visualizer may then use the block coordinates to determine the block placement in the visual representation. The visual representation may also display the blocks in a sequential order that represents the external user's interactions with the call center system.

In some embodiments, the visual representation may include a format identical to a contact flow format. For example, the block coordinates of the blocks in the contact flow format may mirror the block coordinates of the blocks in the visual representation in color, shape, and the like.

In some embodiments, the visual representation may include the contact path and other path transitions that the external user did not take. The contact flow visualizer may display the contact path and the other path transitions in a manner that distinguishes the contact path. For example, the contact flow visualizer may display the contact path in one color and the options that the external user did not take in another color.

The method may further include outputting, by the one or more processors, the visual representation to a user interface of a user device (Step 816). For example, the user device (e.g., user device 105) may display the visual representation on a display (e.g., display/UI 105A). In response to the displaying, the user device may receive an interaction from the user (e.g., developer). For example, the interaction may include a selection of one or more blocks, where, in response to the interaction, the contact flow visualizer may output additional block details (e.g., parameters) on the user interface of the user device.

Figure 9:
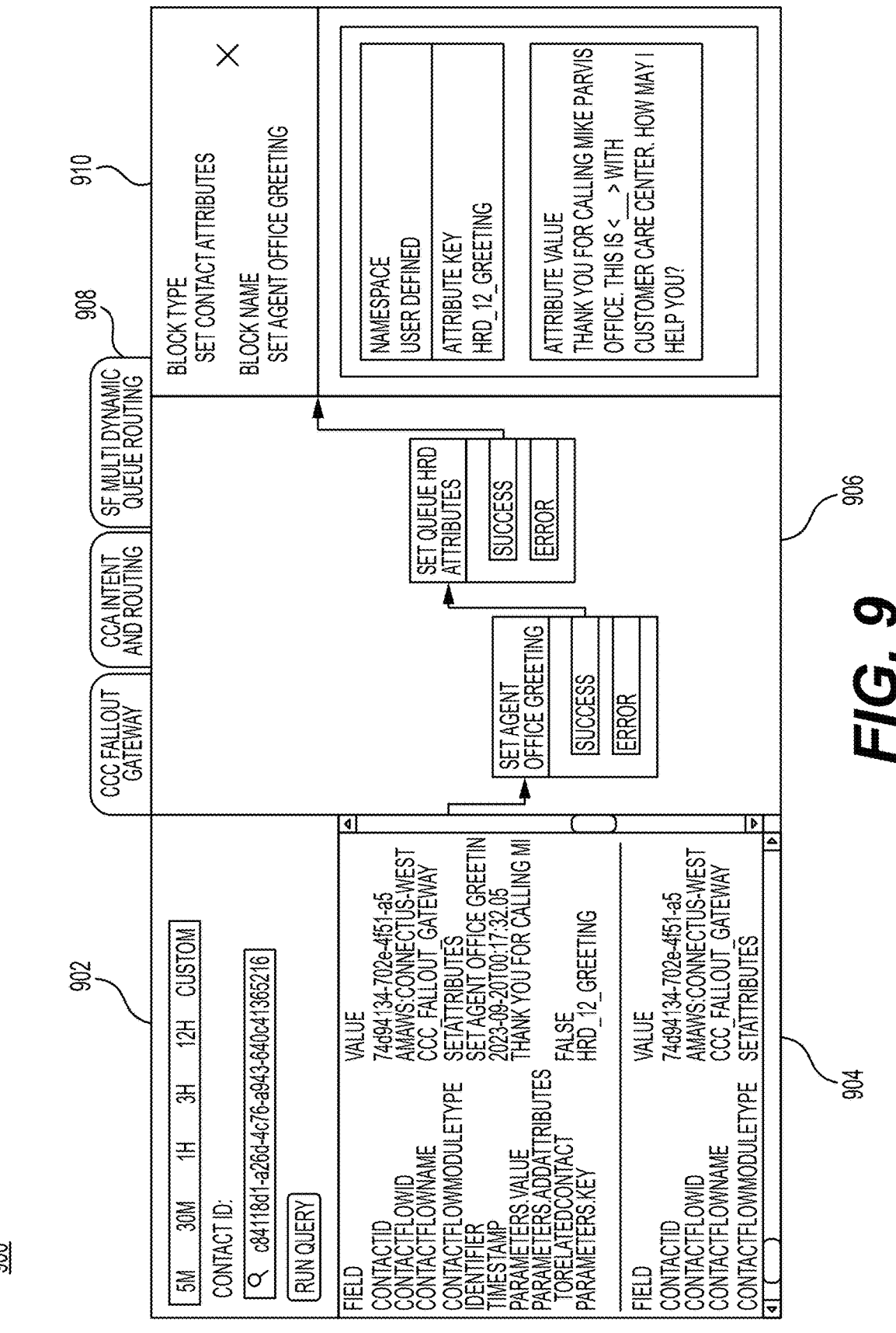
FIG. 9 depicts an exemplary user interface of the contact flow visualizer, according to one or more embodiments.

FIG. 9 depicts an exemplary user interface (e.g., on display/UI 105A) of the contact flow visualizer, according to one or more embodiments. For example, as shown in 902, the user interface may prompt a user for a time range and/or a contact identifier. The user may select a time range (e.g., 5 minutes, 30 minutes, 1 hour, 3 hours, 12 hours, or a custom range) and/or a contact identifier (e.g., c84118d1-a26d-4c76-a943-640c41365216). As shown in 904, the contact flow visualizer may display the values for the contact log, such as the contact flow identifier, parameters, and the like. Such information may allow for a troubleshooter to see both the original logs that were created in addition to the visualized part on the right (906). As shown in 906, the contact flow visualizer may display the blocks and block paths for each action (e.g., "Set Agent Office Greeting," "Set Queue HRD Attributes"). As shown in 908, the contact flow visualizer may also display different details regarding the contact path (e.g., "CCC Fallout Gateway," "CCA Intent and Routing," "SF Multi-Dynamic Queue Routing"). The tabs may represent different contact flows, where the tabs may be labeled according to the contact flow, and the tabs may be ordered in a sequential order according to the communication with the call center system. For example, at the initialization of the call, the external user may have first gone to the "CCC Fallout Gateway" contact flow, then the "CCA Intent and Routing" contact flow, and finally the "SF Multi-Dynamic Queue Routing" contact flow. Additionally, when a user interacts with the contact flow visualizer and selects (e.g., clicks) one of the tabs, the contact flow represented by the tab may be visualized (e.g., in 906) and the corresponding contact logs may be shown in the left hand window (e.g., in 904). As shown in 910, the contact flow visualizer may display the specific block details (e.g., "block type," "block name," "namespace," "attribute key," "attribute value"). Additionally, for example, upon a user selection of one of the blocks (e.g., rectangles) displayed in 906, the right panel (910) may expand to display more information regarding the block, and the left panel (904) may scroll down to the set of contact logs that correspond to the block. This may result in capturing both raw contact logs and their corresponding visualized abstraction.

Although FIG. 8 shows example blocks of exemplary flow chart 800, in some implementations, the exemplary flow chart 800 may include additional blocks, fewer blocks, different blocks, or differently arranged blocks than those depicted in FIG. 8. Additionally, or alternatively, two or more of the blocks of the exemplary flow chart 800 may be performed in parallel.

Exemplary Device

Figure 10:
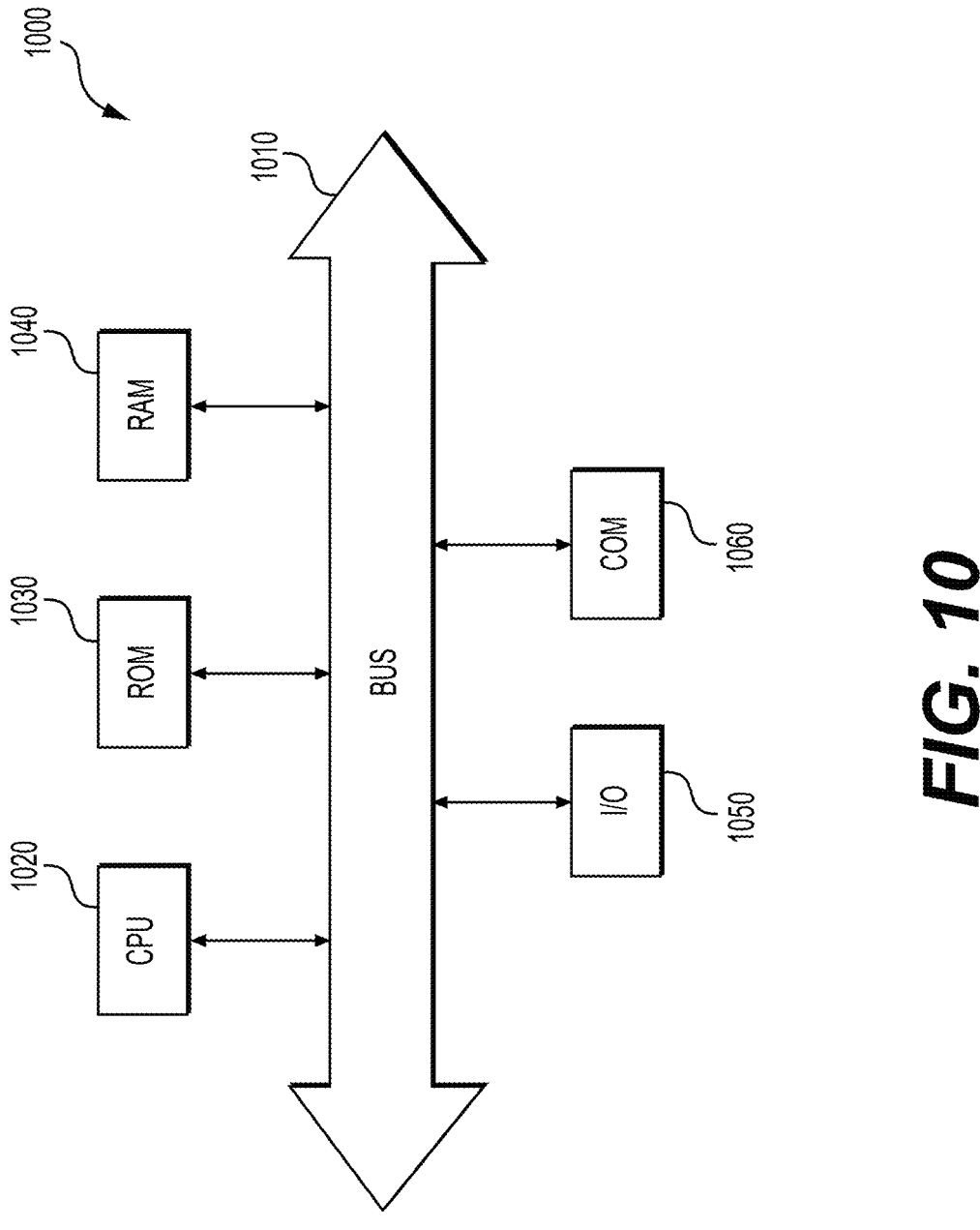
FIG. 10 depicts an example of a computing device that may execute the techniques described herein, according to one or more embodiments.

FIG. 10 is a simplified functional block diagram of a computer 1000 that may be configured as a device for executing the processes of FIGS. 2-9, according to exemplary embodiments of the present disclosure. For example, device 1000 may include a central processing unit (CPU) 1020. CPU 1020 may be any type of processor device including, for example, any type of special purpose or a general-purpose microprocessor device. As will be appreciated by persons skilled in the relevant art, CPU 1020 also may be a single processor in a multi-core/multiprocessor system, such system operating alone, or in a cluster of computing devices operating in a cluster or server farm. CPU 1020 may be connected to a data communication infrastructure 1010, for example, a bus, message queue, network, or multi-core message-passing scheme.

Device 1000 also may include a main memory 1040, for example, random access memory (RAM), and also may include a secondary memory 1030. Secondary memory 1030, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1030 may include other similar means for allowing computer programs or other instructions to be loaded into device 1000. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 1000.

Device 1000 also may include a communications interface ("COM") 1060. Communications interface 1060 allows software and data to be transferred between device 1000 and external devices. Communications interface 1060 may include a modem, a network interface (such as an Ethernet card), a communications port, a PCMCIA slot and card, or the like. Software and data transferred via communications interface 1060 may be in the form of signals, which may be electronic, electromagnetic, optical, or other signals capable of being received by communications interface 1060. These signals may be provided to communications interface 1060 via a communications path of device 1000, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 1000 also may include input and output ports 1050 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as those used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used herein may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In the detailed description herein, references to "embodiment," "an embodiment," "one non-limiting embodiment," "in various embodiments," etc., indicate that the embodiment(s) described can include a particular feature, structure, or characteristic, but every embodiment might not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In general, terminology can be understood at least in part from usage in context. For example, terms, such as "and", "or", or "and/or," as used herein can include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and can, instead, allow for existence of additional factors not necessarily expressly described, again, depending at least in part on context.

As used herein, the terms "comprises," "comprising," or any other variation thereof are intended to cover a non-exclusive inclusion, such that a process, method, composition, article, or apparatus that comprises a list of elements does not include only those elements, but may include other elements not expressly listed or inherent to such process, method, composition, article, or apparatus. The term "exemplary" is used in the sense of "example" rather than "ideal." As used herein, the singular forms "a," "an," and "the" include plural reference unless the context dictates otherwise. Relative terms such as "about," "substantially," and "approximately" refer to being nearly the same as a referenced number or value, and should be understood to encompass a variation of +5% of a specified amount or value.

Certain non-limiting embodiments are described herein with reference to block diagrams and operational illustrations of methods, processes, devices, and apparatus. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the description and the appended drawings, wherein like elements are referred to with the same reference numerals.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

19
20

What is claimed is:

1. A computer-implemented method for a contact flow visualizer, the computer-implemented method for:

receiving, by one or more processors, a contact identifier and a time identifier;

retrieving, by the one or more processors, one or more contact logs corresponding to the contact identifier and the time identifier;

partitioning, by the one or more processors, the one or more contact logs into a plurality of contact log segments based on a contact flow identifier for each of the one or more contact logs;

for each contact log segment, retrieving, by the one or more processors, a plurality of contact flows based on the contact flow identifier of the contact log segment, wherein the plurality of contact flows include a plurality of blocks and a corresponding block identifier for each block;

partitioning, by the one or more processors, the plurality of contact log segments based on the block identifier for each of the plurality of blocks;

analyzing, by the one or more processors, the plurality of partitioned contact log segments based on the plurality of contact flows to determine a contact path;

creating, by the one or more processors, a visual representation of the contact path; and outputting, by the one or more processors, the visual representation to a user interface of a user device.

2. The computer-implemented method of claim 1, wherein the plurality of blocks include one or more transitions and one or more parameters, wherein the one or more transitions correspond to a condition that determines a next path step, wherein the one or more parameters include information corresponding to at least one of the plurality of blocks.

3. The computer-implemented method of claim 2, wherein analyzing the plurality of partitioned contact log segments further comprises:

analyzing, by the one or more processors, the one or more transitions of the plurality of blocks to determine the next path step, and wherein the contact path includes a plurality of next path steps.

4. The computer-implemented method of claim 3, wherein analyzing the plurality of partitioned contact log segments further comprises:

analyzing, by the one or more processors, the plurality of partitioned contact log segments to determine a set of block coordinates; and storing, by the one or more processors, the set of block coordinates for each partitioned contact log segment in a data store.

5. The computer-implemented method of claim 4, wherein creating the visual representation is based on the set of block coordinates for each of the plurality of blocks.

6. The computer-implemented method of claim 2, wherein analyzing the plurality of partitioned contact log segments further comprises:

analyzing, by the one or more processors, the one or more parameters of each of the plurality of blocks to determine the next path step.

7. The computer-implemented method of claim 1, wherein the visual representation includes a format identical to a contact flow format.

8. A computer system for a contact flow visualizer, the computer system comprising:

a memory having processor-readable instructions stored therein; and one or more processors configured to access the memory and execute the processor-readable instructions, which when executed by the one or more processors configures the one or more processors to perform a plurality of functions, including functions for:

receiving a contact identifier and a time identifier;

retrieving one or more contact logs corresponding to the contact identifier and the time identifier;

partitioning the one or more contact logs into a plurality of contact log segments based on a contact flow identifier for each of the one or more contact logs;

for each contact log segment, retrieving a plurality of contact flows based on the contact flow identifier of the contact log segment, wherein the plurality of contact flows include a plurality of blocks and a corresponding block identifier for each block;

partitioning the plurality of contact log segments based on the block identifier for each of the plurality of blocks;

analyzing the plurality of partitioned contact log segments based on the plurality of contact flows to determine a contact path;

creating a visual representation of the contact path; and outputting the visual representation to a user interface of a user device.

9. The computer system of claim 8, wherein the plurality of blocks include one or more transitions and one or more parameters, wherein the one or more transitions correspond to a condition that determines a next path step, wherein the one or more parameters include information corresponding to at least one of the plurality of blocks.

10. The computer system of claim 9, wherein analyzing the plurality of partitioned contact log segments further comprises:

analyzing the one or more transitions of the plurality of blocks to determine the next path step, and wherein the contact path includes a plurality of next path steps.

11. The computer system of claim 10, wherein analyzing the plurality of partitioned contact log segments further comprises:

analyzing the plurality of partitioned contact log segments to determine a set of block coordinates; and storing the set of block coordinates for each partitioned contact log segment in a data store.

12. The computer system of claim 11, wherein creating the visual representation is based on the set of block coordinates for each of the plurality of blocks.

13. The computer system of claim 9, wherein analyzing the plurality of partitioned contact log segments further comprises:

analyzing the one or more parameters of each of the plurality of blocks to determine the next path step.

14. The computer system of claim 8, wherein the visual representation includes a format identical to a contact flow format.

15. A non-transitory computer-readable medium containing instructions for a contact flow visualizer, the instructions comprising:

receiving, by one or more processors, a contact identifier and a time identifier;

retrieving, by the one or more processors, one or more contact logs corresponding to the contact identifier and the time identifier;

partitioning, by the one or more processors, the one or more contact logs into a plurality of contact log segments based on a contact flow identifier for each of the one or more contact logs;

for each contact log segment, retrieving, by the one or more processors, a plurality of contact flows based on the contact flow identifier of the contact log segment, wherein the plurality of contact flows include a plurality of blocks and a corresponding block identifier for each block;

partitioning, by the one or more processors, the plurality of contact log segments based on the block identifier for each of the plurality of blocks;

analyzing, by the one or more processors, the plurality of partitioned contact log segments based on the plurality of contact flows to determine a contact path; and creating, by the one or more processors, a visual representation of the contact path; and outputting, by the one or more processors, the visual representation to a user interface of a user device.

16. The non-transitory computer-readable medium of claim 15, wherein the plurality of blocks include one or more transitions and one or more parameters, wherein the one or more transitions correspond to a condition that determines a next path step, wherein the one or more parameters include information corresponding to at least one of the plurality of blocks.

17. The non-transitory computer-readable medium of claim 16, wherein analyzing the plurality of partitioned contact log segments further comprises:

analyzing, by the one or more processors, the one or more transitions of the plurality of blocks to determine the next path step, and wherein the contact path includes a plurality of next path steps.

18. The non-transitory computer-readable medium of claim 17, wherein analyzing the plurality of partitioned contact log segments further comprises:

analyzing, by the one or more processors, the plurality of partitioned contact log segments to determine a set of block coordinates; and storing, by the one or more processors, the set of block coordinates for each partitioned contact log segment in a data store.

19. The non-transitory computer-readable medium of claim 18, wherein creating the visual representation is based on the set of block coordinates for each of the plurality of blocks.

20. The non-transitory computer-readable medium of claim 16, wherein analyzing the plurality of partitioned contact log segments further comprises:

analyzing, by the one or more processors, the one or more parameters of each of the plurality of blocks to determine the next path step.

* * * * *